United States Patent [19]

Deluty

[11] 4,226,272
[45] Oct. 7, 1980

[54] TIRE TRACTION DEVICE

[76] Inventor: Michael E. Deluty, 37 Addington Rd., Brookline, Mass. 02146

[21] Appl. No.: 944,746

[22] Filed: Sep. 22, 1978

[51] Int. Cl.³ ............................................. B60C 27/00
[52] U.S. Cl. ............................ 152/225 C; 152/226; 403/407
[58] Field of Search ............. 152/225 R, 225 C, 220, 152/DIG. 8, 226-230, 222, 221, 170, 172, 175, 179, 184; 403/406, 407; 301/47, 49

[56] References Cited

U.S. PATENT DOCUMENTS

| | | | |
|---|---|---|---|
| 1,292,698 | 1/1919 | Buchanan et al. | 152/225 C |
| 2,198,906 | 4/1940 | Conway | 152/225 R |
| 3,190,336 | 6/1965 | Batori | 152/227 |

Primary Examiner—John T. Goolkasian
Assistant Examiner—Thomas Bokan
Attorney, Agent, or Firm—Thompson, Birch, Gauthier & Samuels

[57] ABSTRACT

A removable tire traction device adapted to be positioned on a vehicle tire. The device includes approximately four substantially U-shaped cleats which are loosely positioned around the tire. A ring-shaped cleat holder is positioned adjacent to the outer sidewall of the tire. Mounting means is provided on the cleat holder to loosely attach the cleats to the cleat holder whereby the cleats are free to move in all directions within fixed movement limits relative to the cleat holder and the tire.

11 Claims, 8 Drawing Figures

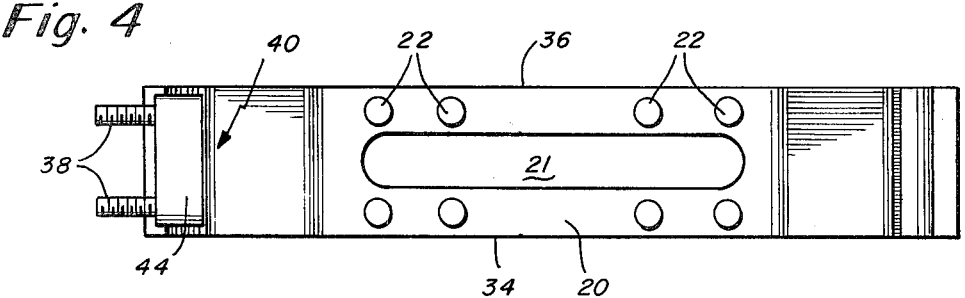
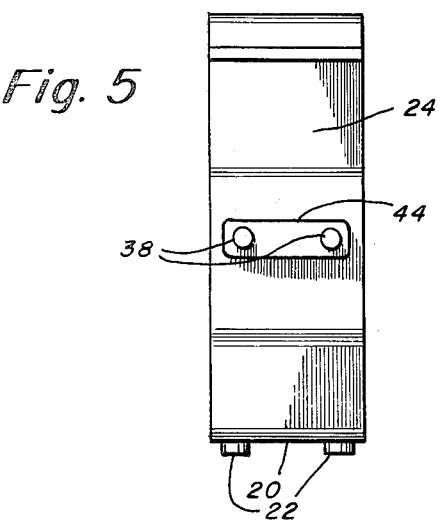
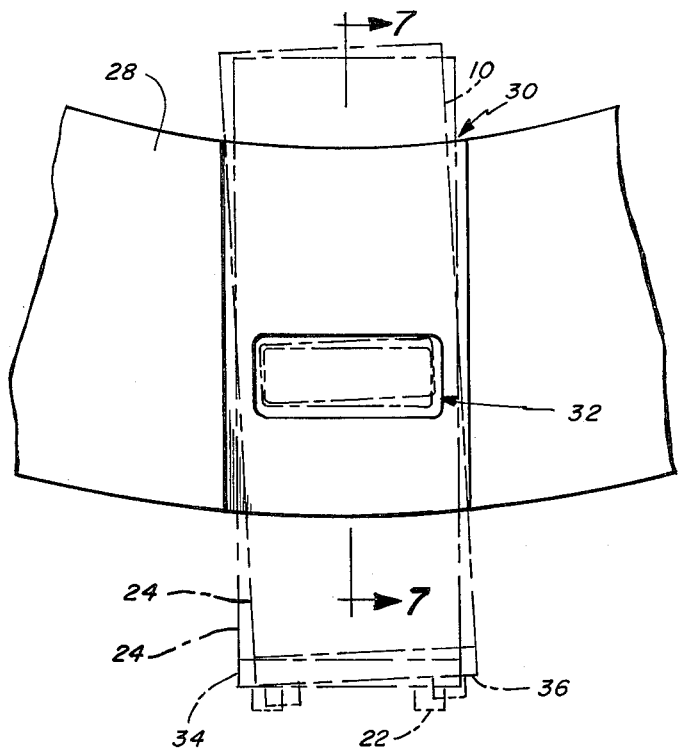
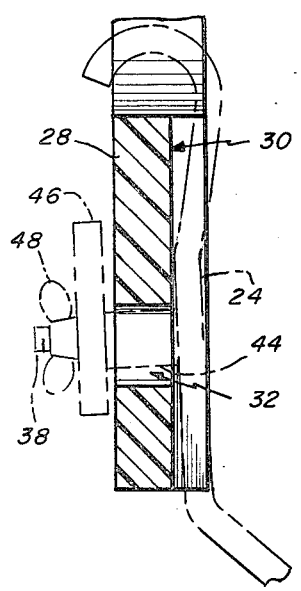

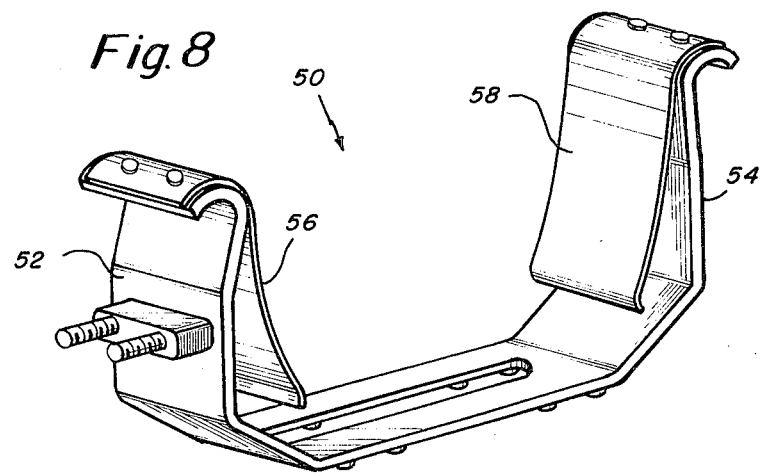

TIRE TRACTION DEVICE

BACKGROUND OF THE INVENTION

This invention relates to a device for providing traction to the powered wheels of a vehicle. The device is useful for extricating a vehicle which has become stuck on a slippery surface, such as ice, snow, or mud, as well as for assisting a vehicle which is to be driven on such surfaces.

Previously, there have been many devices which were adapted to be attached to the powered wheels of a vehicle to increase its traction. Such devices included conventional chains and many cleated devices. One of the problems with such past devices was that they usually included means for pulling the cleats tightly against the tire. This tight arrangement caused the cleats to constantly rub against and to ultimately destroy the tire.

Another of the problems with such past devices was that the cleats were often fixed to or urged against the cleat holder. This tight arrangement also caused the cleats to constantly rub against and to ultimately destroy the tire.

Another of the problems with such past devices was that the devices were difficult or impossible to mount onto the tires unless the tires were lifted above the driving surface. Obviously, such lifting is not possible when the vehicle is stuck in a rut.

Another of the problems with many such past devices was they they required two cleat holders, one on the outside and one on the inside of the tire. This caused the person installing the device to have to reach around to the inner side of the tire (under the vehicle) and to have to work on apparatus elements that he could not see.

The object of this invention is to overcome all of the foregoing problems by providing a tire traction device that is maintained loose on the tire and loose on the cleat holder; that does not destroy the tire; that does not require the tire to be lifted off the ground; and that does not require a second cleat holder to be used on the inner side of the tire. It is another object of this device to achieve the foregoing object while simultaneously providing the vehicle with greatly increased traction at an inexpensive price.

SUMMARY OF THE INVENTION

The tire traction device of this invention can be mounted on a tire quickly and easily without the need for any tools. It is not necessary to lift the vehicle or the tires in order to install the device. The device provides sufficient traction to the tires to enable the vehicle to drive out of deep slippery ruts and to drive on icy, snowy, or muddy streets, while causing virtually no damage to the tires or to the road surface.

The device of this invention includes a number (usually four) of U-shaped cleats. These individual cleats are fitted over the tread of the tire at points which are spaced around the tire's periphery. The cleats fit very loosely on the tire when the cleats are not in contact with the underlying driving surface. Each cleat fits less loosely on the tire when that cleat contacts the driving surface. This less loose fit is caused by the tire tread's rolling over and engulfing the cleat.

The device also includes a cleat holder which is preferably ring-shaped and which is positioned adjacent to the outer sidewall of the tire. The cleats are mounted onto the cleat holder by means of special mounting attachments. These attachments cause the cleats to be loose-fitting and "sloppy" so that the cleats can move in all directions on the tire within the limits. The cleat holder is not affixed to the tire or to the wheel which holds the tire.

Therefore, the fit of the cleats on the tire is always loose except when the cleat is in contact with the ground. Then, the cleat is instantaneously pinched and engulfed by the tire tread and traction is produced between the tire and the ground. This loose fitting cleat arrangement prevents damage to the tire.

DESCRIPTION OF THE DRAWINGS

FIG. 4 is a bottom plan view of the cleat of this invention.

FIG. 5 is a side elevational view of the cleat.

FIG. 6 is a view of the interior of the cleat holder taken along lines 6—6 of FIG. 2 showing the free movement of the cleat relative to the cleat holder.

FIG. 7 is a cross-sectional view taken along lines 7—7 of FIG. 6.

FIG. 8 is a perspective view of an alternative embodiment of the cleat which can be used with the traction device.

DESCRIPTION OF THE PREFERRED EMBODIMENT

Figure 1:
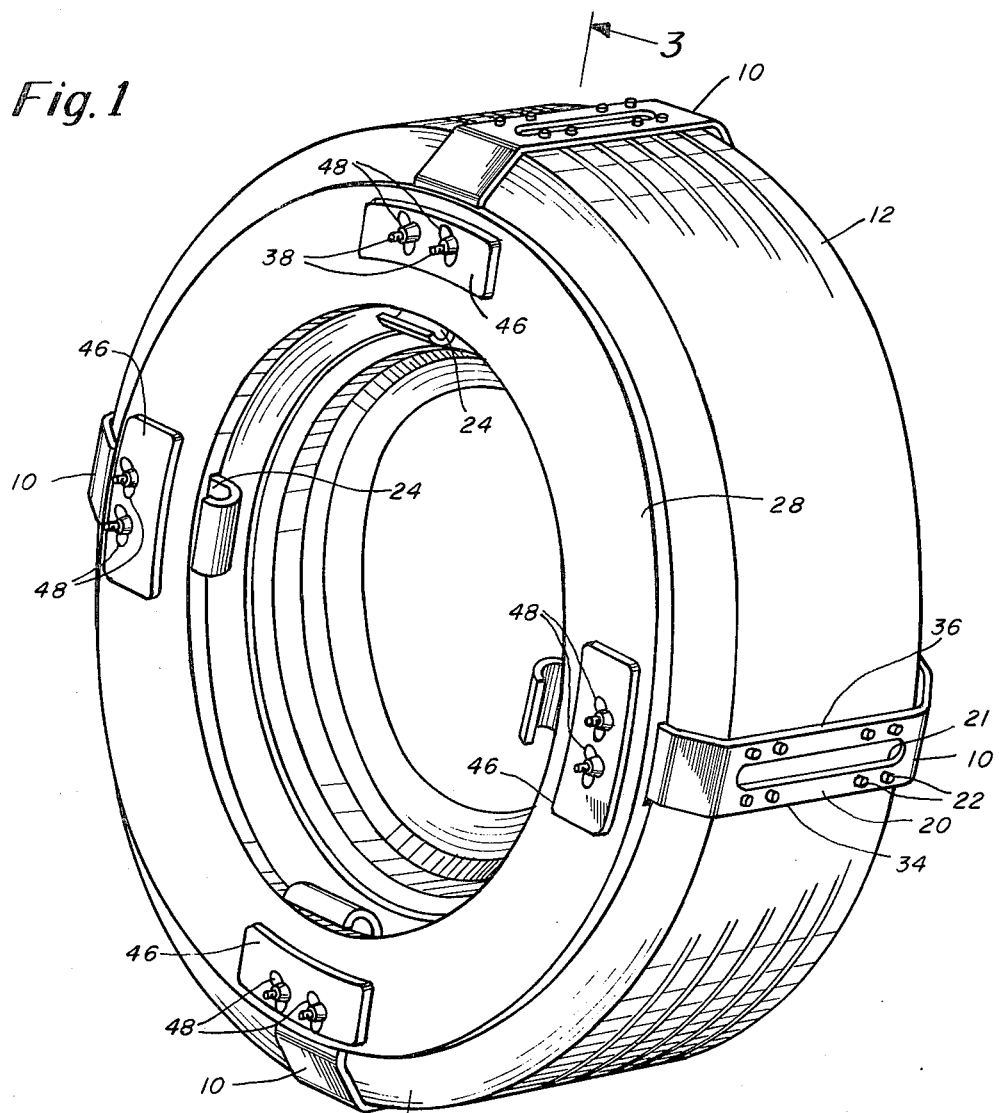
FIG. 1 is a perspective view of the traction device of this invention installed on a tire.

The preferred embodiment of the tire traction device is shown installed in a tire in FIG. 1. Four substantially U-shaped cleats 10 are loosely fitted around the circumference of a conventional tire 12 in an equally spaced-apart arrangement. Each cleat 10 is preferably made of flexible plastic. Four cleats are preferred, although a lesser or greater number could also be used. The cleats fit over and extend around the tire's outer sidewall 14, tread 16, and inner sidewall 18. The bottom exterior portion 20 of each cleat 10 has traction means including a cut-out slot 21 and numerous protruding studs 22 for interacting with and digging into the snow, ice or mud. Various other types of traction means could be substituted for the shown slot 21 and studs 22. For example, a textured or irregular surface could be used.

The leading and trailing edges 34 and 36, respectively, of cleat 10 could also be modified to increase the smoothness of the ride of the vehicle. This modification would consist of adding curved extensions to edges 34 and 36 to lengthen and concentrically curve the "tread" of the cleat.

Figure 3:
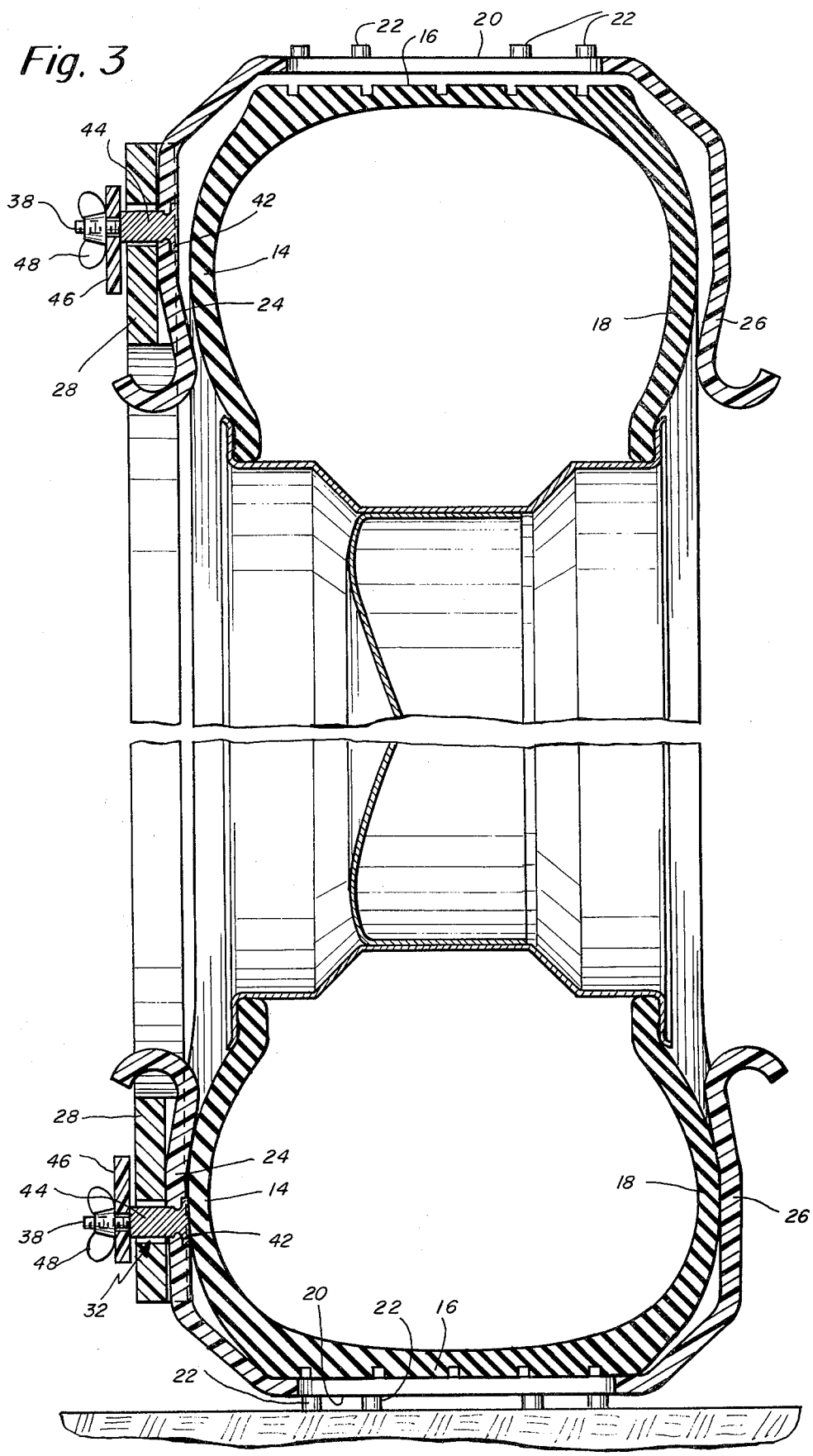
FIG. 3 is a cross-sectional view taken along lines 3—3 of FIG. 1. A portion of the wheel has been removed.

The interior configuration of cleat 10 is shaped and sized so that each cleat fits loosely around the tire 12 when that cleat and its adjacent tire portion are not in contact with the ground (see the upper portion of FIG. 3). However, when any cleat contacts the ground, and the tire tread rolls over that cleat, that cleat fits less loosely (i.e. more tightly) around tire 12 (see the lower portion of FIG. 3). The reason for this less loose fit is that when the cleat contacts the ground, and the tire tread flexibly rolls over the cleat, the weight of the vehicle causes the tire tread portion to flatten out and to simultaneously contact the grond both ahead of and behind the cleat. This tread action engulfs and pinches the cleat so that the cleat tends to revolve with the tire.

This produces effective traction between the tire and the ground. It should be understood that even when one cleat is briefly engulfed and pinched by the tire as it rolls over the cleat, the other cleats remain loosely fitted around the tire. Thus, at times, all cleats are loosely fitted around the tire (when no cleat is in contact with the ground), and at other times, all cleats but one are loosely fitted around the tire (when that one cleat is in contact with the ground).

Furthermore, when the cleat contacts the ground, and the tire tread flexibly rolls over the cleat, the weight of the vehicle also causes the tire sidewalls to bulge slightly and to substantially fill the interior of cleat 10. Outer wall 24 and inner wall 26 of the cleat are preferably resilient so that one wall or both walls can be spread by the bulging sidewalls. However, even when both cleat walls 24 and 26 are resiliently spread, they do not tightly grip the tire. Instead, the cleat walls somewhat conform to the configuration of the sidewalls while permitting slippage between the cleat walls and the sidewalls.

The cleat holder 28 is, like cleat 10, preferably made of flexible plastic. The cleat holder is preferably ring-shaped with an open center and is a single piece (see FIG. 1). Alternatively, cleat holder 28 could be made of other materials, could be made with a plurality of linked segments, and/or could be noncircular, e.g. triangular.

Cleat holder 28 is adapted to be positioned adjacent to the outer sidewall 14 of tire 12. If cleat holder 28 has recesses where the cleats are mounted to it (as shown in the drawings), the cleat holder is positioned near to the outer sidewall 14 of tire 12. If the cleat holder is planar on its inner surface, it is spaced a greater distance from the tire's outer sidewall 14. In the shown preferred embodiment, cleat holder 28 is provided with four circumferentially spaced-apart recesses or channels 30 which are slightly wider than the width of the cleat's outer wall 24 (see FIG. 6). Regardless of whether the cleat holder is positioned near to or far from the tire's sidewall, the cleat holder is in no way affixed directly to the tire or to the wheel which holds the tire.

Cleat holder 28 is also provided with four spaced-apart apertures 32 which are formed in the bottom walls of channels 30. The size and shape of apertures 32 are important functional features because they produce a loose fit between the cleats and the cleat holder.

In order to prevent the cleats from flying off the tire, the cleats are loosely attached to the cleat holder, and the cleat/cleat holder assembly is loosely (but securely) positioned around the tire. The cleats are permitted to move in all directions relative to the tire and to the cleat holder, with no restrictions or biases except for fixed final limits to such movements. In other words, the cleats are permitted initially free and unrestricted movement in all directions with physical stops located to ultimately limit such movements.

Figure 2:
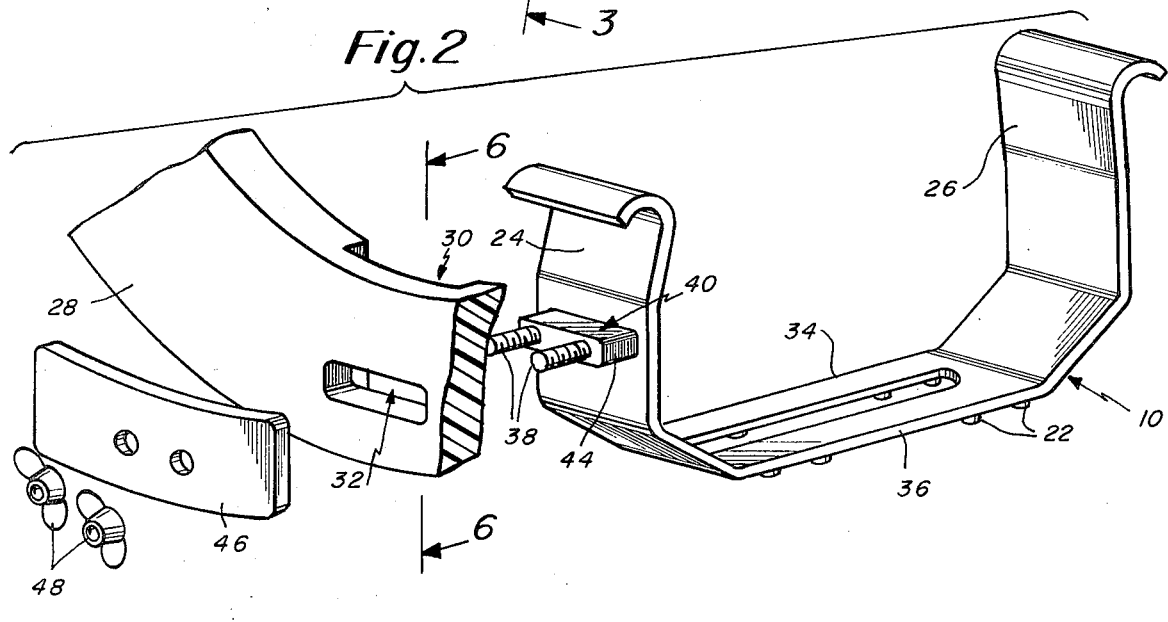
FIG. 2 is an exploded perspective view showing the elements of the traction device.

The attachment system by which each cleat is attached to the cleat holder includes two bolts 38 which are fixed to a base 40 which is firmly embedded in the outer wall 24 of cleat 10. The base 40 has a thin lower portion 42 and a thick upper portion 44. The two bolts 38 protrude outwardly from upper portion 44 and are parallel and spaced-apart (see FIG. 2).

The aperture 32 in cleat holder 28 is oversized or undersized relative to the upper portion 44 in every direction. That is, the height and width of aperture 32 are both larger, and the depth of aperture 32 is smaller, than the corresponding height, width, and depth of upper portion 44. This means that when aperture 32 of cleat holder 28 is slipped over bolts 38 and over upper portion 44, the fit is loose in all directions. In fact, there is no restriction to relative movement between the cleat and the cleat holder until the upper portion 44 physically contacts the walls of aperture 32 (see FIG. 6), or until washer plate 46 or outer wall 24 physically contact the cleat holder (see FIG. 7). Alternatively, depending upon the various dimensions selected, there is no restriction to relative movement between the cleat and the cleat holder until the edges of outer wall 24 physically contact the side walls of channel 30 (see FIG. 6).

The other components of the attachment system are the washer plate 46 and the wing nuts 48. In the preferred embodiment, the washer plate 46 bears against the outer face of upper portion 44, and the wing nuts bear against the washer plate. The washer plate and the wing nuts loosely confine the cleat holder between the cleat and the washer plate. Obviously, other equivalent mechanical elements could be substituted for the bolts 38, base 40, aperture 32, washer plate 46, and wing nuts 48. For example, there could be a single bolt; the base could be shaped differently; the aperture could be shaped differently; the washer plate could be omitted; or the wing nuts could be a different fastener type. The important requirement is that the cleats be retained on the cleat holder, but that the cleats be absolutely free to move relative to the cleat holder and relative to the tire within fixed limits.

To install the device on a vehicle's tire, two cleats are first placed onto the tire at approximately the 45° and 315° positions (assuming that 0° corresponds to 12 o'clock). Each cleat is placed so that its outer wall 24 (the wall supporting the base 40) is placed adjacent to the tire's outer sidewall 14. Then, the cleat holder is positioned in alignment with the tire's outer sidewall 14 so that two of the cleat holder's apertures 32 slip over the bolts 38 of the two cleats. Two washer plates 46 and four wing nuts 48 are then applied to the four bolts 38. The wing nuts are tightened so that some of the slack (but not all) is taken up.

Then, the remaining two cleats are placed onto the tire at approximately the 135° to 225° positions. The lower periphery of the cleat holder is moved towards the tire so that the remaining two apertures 32 slip over the bolts 38 of the remaining two cleats. Again, the washer plates 46 are slipped over the bolts, and the wing nuts 48 are threaded onto the bolts. Finally, all of the wing nuts 48 are tightened securely.

Even though the wing nuts are fully tightened, the cleats are free to unrestrictedly move in all directions within fixed physical limits. FIG. 6 clearly shows how aperture 32 is higher and wider than upper portion 44. FIGS. 3 and 7 show how aperture 32 is shallower (shorter) than upper portion 44. FIG. 6 shows how channel 30 is wider than cleat outer wall 24. Because of these dimensional differences, the attachment of the cleats to the cleat holder, and the attachment of the cleat/cleat holder assembly to the tire is loose.

The result of this constructional arrangement is a device which is floppy to a certain extent. This characteristic creates increased tire traction with reduced tire damage. The cleats hardly touch the tire at all except when the cleats are in contact with the road surface. The cleats are not pulled as a group towards the tire by a cleat mounting means. Instead, the cleats are maintained in loose (but secure) centered engagement around the tire. In fact, the entire device can momentarily rotate relative to the tire when too much stress occurs. Such rotation can occur because the device of this invention is not fixed to the tire or to the tire's supporting mechanisms. Instead, the device is structurally self-supporting and is independent (within limits) of the tire around which it has been assembled. Of course, the tire itself also provides fixed movement limits to the entire device.

DESCRIPTION OF THE ALTERNATIVE EMBODIMENT

FIG. 8 shows an alternative embodiment of the cleat. Cleat 50 is preferably made of steel. Cleat 50 could be made of plastic, except that the bolts and base should be hard metal.

Steel cleat 50 is essentially identical to plastic cleat 10 except that cleat 10 has inherently resilient cleat walls 24 and 26 whereas cleat 50 employs resilient spring arms 56 and 58 on cleat walls 52 and 54, respectively. The purpose of these spring arms is to maintain the cleat centered on the tire.

When cleat 50 contacts the ground and the tire tread rolls over the cleat, the tire's sidewalls bulge. This bulging is accommodated by the spring arms which somewhat conform to the profile of the sidewalls, but which do not tightly grip the tire. In fact, the spring arms permit free relative motion between the cleats and the tire.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:

1. A removable traction increasing device for use on a vehicle tire comprising:
   (a) a plurality of independent separate substantially U-shaped cleats sized and shaped to be adapted to fit around the tire, each said cleat extending and fitting around the outer sidewall, the tread, and the inner sidewall of the tire, each said cleat having traction means on the bottom exterior portion of said cleat for gripping the underlying road surface;
   (b) each said cleat having an interior portion sized and shaped to fit loosely around the tire when said cleat is out of contact with the underlying road surface; said interior portion fitting less loosely around the tire when said cleat is in contact with the underlying road surface;
   (c) a single cleat holder adapted to be positioned adjacent to the outer sidewall of the tire, said cleat holder being unaffixed to the tire or to the tire's wheel;
   (d) means for loosely and detachably mounting said cleats on said cleat holder at spaced-apart locations on said cleat holder, said cleat mounting means preventing said cleats from being urged and solidly maintained against said cleat holder; and
   (e) said cleat mounting means including a stud holding base mounted on said cleat, at least one stud being embedded in and protruding from said stud holding base, walls forming an oversized aperture in said cleat holder through which said stud is adapted to protrude without necessarily touching said aperture walls, said stud holding base protruding through and being dimensionally smaller than said cleat holder oversized aperture, and fastener means engaging said stud, said cleat holder adapted to be confined between said cleat and said fastener without necessarily touching either one.

2. A removable traction increasing device for use on a vehicle tire comprising:
   (a) a plurality of independent separate substantially U-shaped cleats sized and shaped to be adapted to fit around the tire, each said cleat extending and fitting around the outer sidewall, the tread, and the inner sidewall of the tire, each said cleat having traction means on the bottom exterior portion of said cleat for gripping the underlying road surface;
   (b) each said cleat having an interior portion sized and shaped to fit loosely around the tire when said cleat is out of contact with the underlying road surface, said interior portion fitting less loosely around the tire when said cleat is in contact with the underlying road surface;
   (c) a single cleat holder adapted to be positioned adjacent to the outer sidewall of the tire, said cleat holder being unaffixed to the tire or to the tire's wheel;
   (d) means for loosely and detachably mounting said cleats on said cleat holder at spaced-apart locations on said cleat holder, said cleat mounting means preventing said cleats from being urged and solidly maintained against said cleat holder; and
   (e) said cleat mounting means including at least one stud embedded in each said cleat, walls forming an oversized aperture in said cleat holder through which said stud is adapted to protrude without necessarily touching said aperture walls, walls forming an oversized radially extending channel in said cleat holder, said cleat being seated in said channel and being dimensionally narrower than said channel, and fastener means engaging said stud, said cleat holder adapted to be confined between said cleat and said fastener without necessarily touching either one.

3. The device of claim 1 or 2 wherein said cleats have flexible walls.

4. The device of claim 1 or 2 wherein said cleats have rigid walls.

5. The device of claim 1 or 2 wherein said cleat is a one piece element.

6. The device of claim 1 or 2 wherein said interior cleat portion has opposed spring means mounted thereon for centering said cleat on said tire.

7. The device of claim 1 or 2 wherein said cleat holder is flexible.

8. The device of claim 1 or 2 wherein said cleat holder is ring-shaped.

9. The device of claim 1 or 2 wherein said cleat holder is a one piece element.

10. The device of claim 1 or 2 wherein said cleat mounting means includes at least one washer plate and at least one nut.

11. The device of claim 1 or 2 wherein said cleat mounting means spaces said washer plate from said cleat by a distance greater than the thickness of said cleat holder.

* * * * *